(12) United States Patent
Fuchs et al.

(10) Patent No.: US 12,507,634 B2
(45) Date of Patent: Dec. 30, 2025

(54) ROUND BALER AND METHOD FOR OPERATING A ROUND BALER

(71) Applicant: Usines CLAAS France SAS, St. Rémy/Woippy (FR)

(72) Inventors: Volker Fuchs, Saarburg (DE); Renaud Wucher, Metz (FR); Romain Dubois, Metz (FR)

(73) Assignee: Usines CLAAS France S.A.S, St. Rémy/Woippy (FR)

(*) Notice: Subject to any disclaimer, the term of this patent is extended or adjusted under 35 U.S.C. 154(b) by 420 days.

(21) Appl. No.: 18/195,997

(22) Filed: May 11, 2023

(65) Prior Publication Data

US 2023/0363318 A1    Nov. 16, 2023

(30) Foreign Application Priority Data

May 11, 2022   (DE) .................... 10 2022 111 818.5

(51) Int. Cl.
| | |
|---|---|
| *A01F 15/08* | (2006.01) |
| *A01F 15/07* | (2006.01) |
| *A01F 15/10* | (2006.01) |
| *A01F 15/18* | (2006.01) |

(52) U.S. Cl.
CPC .......... *A01F 15/0833* (2013.01); *A01F 15/07* (2013.01); *A01F 15/106* (2013.01); *A01F 15/18* (2013.01); *A01F 2015/0795* (2013.01)

(58) Field of Classification Search
CPC ............. A01F 15/0833; A01F 15/0825; A01F 15/085; A01F 15/07; A01F 2015/0795
See application file for complete search history.

(56) References Cited

U.S. PATENT DOCUMENTS

| | | | |
|---|---|---|---|
| 4,391,187 A | 7/1983 | Koning et al. | |
| 4,611,535 A | 9/1986 | Anstey et al. | |
| 5,408,817 A | * 4/1995 | Wagstaff ............. | A01F 15/0833 56/341 |

(Continued)

FOREIGN PATENT DOCUMENTS

| | | |
|---|---|---|
| DE | 19718229 A1 | 11/1998 |
| DE | 19856977 A1 | 6/2000 |

(Continued)

*Primary Examiner* — Kristen C Hayes
(74) *Attorney, Agent, or Firm* — Lempia Summerfield Katz LLC

(57) ABSTRACT

A round baler and a method for operating a round baler are disclosed. The round baler has a variable diameter and is bounded by an endlessly rotating pressing means. The pressing means is guided by a plurality of rollers, wherein a loop of the pressing means is guided by a first clamping arm mounted on the housing side and by a second clamping arm mounted on the housing side. The first and second clamping arms are adjusted by actuators so that at least one compaction pressure is generated with which the pressing means acts to form a round bale. A control unit automatically controls the actuators depending on a compaction power curve, accounting for operating parameters and/or environmental parameters of the round baler, thereby maintaining a substantially stable operating point during the shaping process, in which the required compaction power and the available drive power are substantially equal.

20 Claims, 6 Drawing Sheets

(56) References Cited

U.S. PATENT DOCUMENTS

| | | | |
|---|---|---|---|
| 5,615,544 A * | 4/1997 | Berger | A01F 15/0833 100/88 |
| 6,530,311 B1 | 3/2003 | Wilkens et al. | |
| 11,026,371 B2 | 6/2021 | Mcclure | |
| 2019/0090430 A1 | 3/2019 | Arnould et al. | |
| 2020/0323147 A1* | 10/2020 | McClure | A01F 15/07 |
| 2022/0225573 A1* | 7/2022 | Cooley | A01B 69/008 |

FOREIGN PATENT DOCUMENTS

| | | | | |
|---|---|---|---|---|
| EP | 3298881 A1 | | 3/2018 | |
| EP | 3888899 A1 * | | 10/2021 | B30B 9/3007 |
| WO | 2021001456 A1 | | 1/2021 | |

\* cited by examiner

ROUND BALER AND METHOD FOR OPERATING A ROUND BALER

CROSS REFERENCE TO RELATED APPLICATION

This application claims priority under 35 U.S.C. § 119 to German Patent Application No. DE 102022 111 818.5 filed May 11, 2023, the entire disclosure of which is hereby incorporated by reference herein. This application incorporates by reference U.S. application Ser. No. 18/960,000 entitled "ROUND BALER AND METHOD FOR OPERATING A ROUND BALER" in its entirety.

TECHNICAL FIELD

The present invention relates to a method for operating a round baler and a round baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In conventional variable round balers, before starting the round baler, an operator of a tractor towing the round baler over an agricultural area usually specifies a compaction pressure setpoint and a bale starting diameter using an operating unit. The compaction pressure setpoint specifies the compaction pressure at which the round bale is to be formed in the variable bale chamber of the baler. The bale start diameter defines the diameter starting at which the round bale is to be subjected to the specified compaction pressure during the compaction process in the bale chamber.

DE 198 56 977 A1 discloses a method for operating a round baler and a round baler. Specifically, the round baler has a variable-diameter baling chamber arranged or positioned in a housing and bounded by a continuously rotating pressing means. The pressing means is guided by several rollers. For this purpose, a loop of the pressing means is guided by a clamping arm which is pivotably mounted on the housing side and has rollers on the baling chamber side. The clamping arm is adjusted in its position by hydraulically-actuated actuators so that at least one compaction pressure is generated with which the pressing means acts to form a round bale. When there is a reduced supply of material, the method according to DE 198 56 977 A1 provides that the compaction pressure is automatically increased during bale formation when the supply of material to the variable bale chamber is interrupted or relatively low. For this purpose, a lower limit value and an upper limit value for a drive torque are specified by an operator, wherein the compaction pressure is increased if the lower limit value of the drive torque is exceeded. The upper limit value of the drive torque forms the limit up to which the maximum compaction pressure is to be increased.

EP 3 298 881 A1 and US Patent Application Publication No. 2019/0090430 A1 further disclose a round baler. US Patent Application Publication No. 2019/0090430 A1 is incorporated by reference herein in its entirety.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
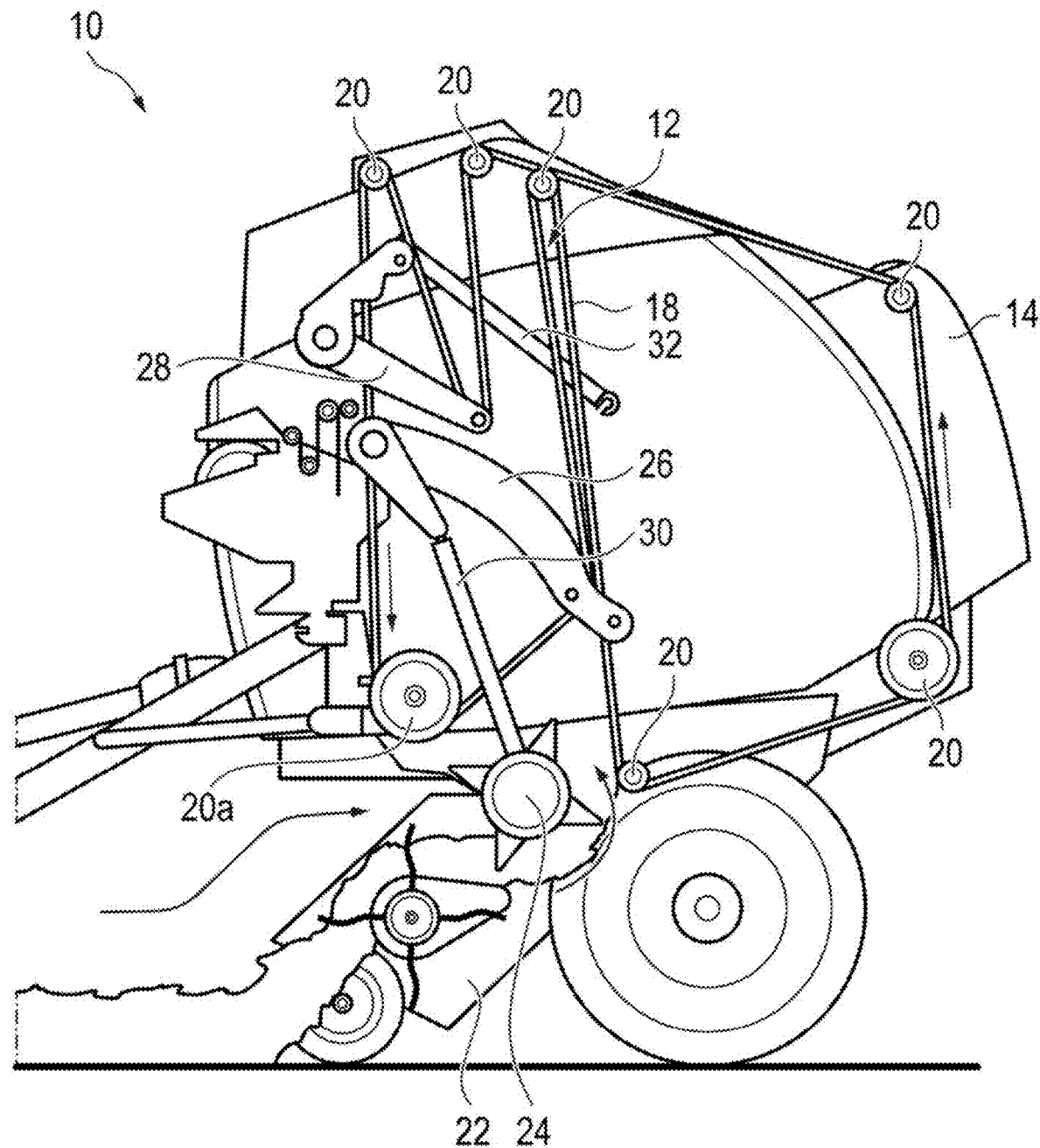
FIG. 1 shows a schematic representation of a round baler with a variable bale chamber.

As discussed in the background, DE 198 56 977 A1 discloses a method for operating a round baler and a round baler, which reacts to fluctuations in the material supply with changes in the compaction pressure. The automatic change of the compaction pressure by the round baler only takes into account a change in the feed. Other operating parameters and/or environmental parameters of the round baler that may influence the manufacturing process are not taken into account in this procedure. It is therefore the responsibility of the operator to adjust or vary the operating parameters of the baler if environmental conditions change during operation of the round baler. Failure to make such adjustments will result in the round baler operating at only moderate or low efficiency.

Thus, in one or some embodiments, a round baler and a method for operating the round baler are configured to operate in such a way that has a more efficient operation.

In one or some embodiments, a method is disclosed for operating a round baler with a variable-diameter baling chamber arranged in a housing and bounded by a rotating pressing device, such as a continuously rotating pressing means. The pressing device (e.g., the pressing means) may be driven and/or guided by one or more rollers (such as a plurality of rollers). A loop of the pressing means may be guided by a first clamping arm which may be pivotably mounted on the housing side and may have rollers on the baling chamber side, and the pressing means may be guided by a second clamping arm which may be pivotably mounted on the housing side and may have at least one roller on a free end. The first clamping arm and the second clamping arm may be adjusted in their position by one or more hydraulically-actuated actuators so that at least one compaction pressure is generated with which the pressing means acts to form a round bale. In one or some embodiments, the actuators for adjusting the two clamping arms are automatically controlled depending on at least one compaction power curve predetermined by a control unit of the round baler and, taking into account operating parameters influencing the compaction power curve and/or environmental parameters of the round baler, a substantially stable operating point may be maintained during the shaping process, in which the required compaction power and the available drive power may be substantially equal. This may ensure improved or optimized operation of the baler, wherein the desired round bale characteristics may be achieved regardless of whether operating and/or environmental parameters change during operation, and without the need for an operator to take action in this regard. A selected compression ratio may automatically be maintained, such as may always be automatically maintained, even when environmental conditions change during operation of the round baler. Operating parameters and/or environmental parameters of the round baler may include different moisture contents of the harvested material to be compacted and/or fluctuations in the amount of fed harvested material.

In particular, using an input/output unit of the control unit, input variables may be specified by an operator in order to determine the compaction power curve to be specified from compaction power curves stored in a memory unit of the control unit depending on the input variables. For example, a plurality of compaction power curves may be correlated to different input values that stored in a memory unit accessible by the control unit. Based on the input variable(s), the control unit may select a respective compaction power curve that is correlated to respective value(s) input for the input variables.

For this purpose, any one, any combination, or all of a harvested material type, a bale shape, bale diameters and absolute or relative values for compaction pressures may be specified as input variables. The input for the bale diameter may include a bale start diameter and a bale end diameter as minimum and maximum values. Depending on the bale shape, the input may comprise absolute or relative values for the compaction pressures, which may be assigned to the values for the bale start diameter and the bale end diameter. Possible bale shapes may include a soft core bale or a hard bale. In the case of hard bales, relative values for the compaction pressures may be entered, while in the case of the soft core bale, absolute values for the compaction pressures may be entered.

Furthermore, the input variables may be used to determine the target for the compaction pressure as a function of the current diameter based on a recipe, rules, or an algorithm. In this context, in one or some embodiments, the control unit may automatically convert the input variables for the bale-shape-specific production of the bale (e.g., a soft-core bale or a hard bale) on the basis of stored recipes, sets of rules, or algorithms into a compaction power curve depending on the current diameter. These recipes, rules, or algorithms may then change the target compaction load depending on the current diameter of the bale to be produced.

In one or some embodiments, the forces to be applied dynamically to the two clamping arms by the actuators may be calculated automatically, taking into account the operating parameters and/or the environmental parameters.

In particular, performance maps stored in the memory unit of the control unit may be used to control the actuators to adjust the force ratios of the clamping arms. For example, the control unit may be in communication with the actuators in order to send a command to control the actuators in order to adjust the force ratios of the clamping arms.

In one or some embodiments, working pressures of the actuators of each clamping arm may each be monitored by a pressure relief valve. Compared to the solution known from the prior art, which provides a common pressure relief valve for monitoring the coupling of force of the two clamping arms in the hydraulic compression circuit for controlling the compaction pressure, according to this embodiment, at least two pressure relief valves (such as exactly two pressure relief valves) may be used, which may make it possible to control the force balance between the two clamping arms for clamping the pressing means using a control algorithm executed by the control unit. In one or some embodiments, the pressure relief valve may be used to control or limit the pressure applied to respective clamping arms. In one or some embodiments, the pressure relief valve may be configured to open at a predetermined set pressure. Further, in one or some embodiments, the control unit may be configured to dynamically set the predetermined set pressure, thereby controlling the amount of pressure applied by the respective clamping arm. For example, the control unit may command that the first pressure relief value be set to a first predetermined set pressure (thereby controlling the first clamping arm) and that the second pressure relief value be set to a second predetermined set pressure (thereby controlling the second clamping arm). In one or some embodiments, as discussed in more detail below, the values selected for the first pressure relief value and the second pressure relief value may be determined by the control unit, such as based on any one, any combination, or all of: one or more input values; one or more operating parameters; a selected compaction power curve; etc.

In one or some embodiments, the control unit may monitor the occurrence of slippage may be monitored. The occurrence of slippage between the pressing means and one of the rollers, such as a roller for driving, may represent a critical operating situation which may be countered by the monitoring.

In response to the occurrence of slippage, the control unit may automatically reduce the compression output when a slip limit value is reached.

Furthermore, the control unit may automatically issue a warning to the operator when a slip limit value is reached. For this purpose, the control unit may control the input/output unit to generate a corresponding visual and/or audible warning.

In one or some embodiments, a round baler is disclosed. The round baler may include a baling chamber having a variable diameter and arranged or positioned in a housing, wherein the baling chamber may be bounded by a rotating pressing device, such as a continuously rotating pressing means. One or more rollers, such as a plurality of rollers, may be provided which drive and/or guide the pressing means, with a first clamping arm which may be pivotably mounted on the housing side and may have rollers on the baling chamber side for guiding a loop, and with a second clamping arm which may be pivotably mounted on the housing side and may have at least one roller at a free end for guiding the pressing means. One or more hydraulically-actuated actuators for adjusting the position of the first clamping arm and the second clamping arm may be provided for generating a compaction pressure with which the pressing means acts to form a round bale. A control unit of the round baler may be configured to automatically control the one or more hydraulically-actuated actuators for adjusting the clamping arms depending on at least one compaction power curve predetermined by the control unit and, taking into account operating parameters influencing the compaction power curve and/or environmental parameters of the round baler during the shaping process, to maintain a substantially stable operating point at which the required compaction power and the available drive power may be substantially equal. Reference may be made to all explanations concerning the method for operating the baler according to the disclosed method.

In particular, the control unit may comprise an input-output unit (e.g., a touchscreen) which may be configured for the operator to input variables. The input/output unit may be configured to input any one, any combination, or all of the harvested material type, bale shape, bale diameter and absolute or relative values for compaction pressures as input variables. In one or some embodiments, the input variables of the bale diameter and compaction pressures may be set as range data, such as by using graphically visualized bar charts.

In particular, the round baler may include one or more sensor devices configured to sense one or more aspects of the moisture content of collected harvested material (e.g., configured to generate data indicative of the moisture content in order to determine the moisture content of collected harvested material) and/or the feed quantity collected and/or fed to the baling chamber. The moisture content and/or the feed quantity may represent essential operating parameters and/or environmental parameters that may influence the bale forming process. The feed quantity may be determined, for example, by layer height detection in a pick-up device of the baler.

Referring to the figures, FIG. 1 shows a schematic representation of a round baler with a variable bale chamber in a side view. The round baler 10 may have a variable baling chamber 12 in a housing 14. For pressing a round bale 16, the baler 10 may have a pressing device, such as a continuously circulating pressing means 18. The pressing means 18 may be formed from one or more pressing belts or chains. An example of the pressing means 18 is disclosed in US Patent Application Publication No. 2019/0090430 A1, incorporated by reference herein in its entirety. In one particular example, the pressing means 18 may comprise a press belt that works in combination with a press chamber. The press belt may be guided by one or more guide rollers, which may be circulatingly mounted within an interior space of a housing of the round baler (e.g., the press belt may be designed in the form of an endless belt and placed about the guide rollers in such a manner that the press belt may circulate within the interior of the housing along a running track). The press belt may delimit the press chamber so that material fed to the press chamber may be formed into a round bale within the press chamber. In one or some embodiments, the press chamber is not variable, instead having a fixed cross section. Alternatively, the press chamber may be variable, discussed below (e.g., the press belt may be gradually readjusted with the growing of the round bale, and in this way, may exert a pressing action on the harvest material even in the initial state of the round bale). In practice, A surface of the press belt facing the harvest material to be pressed may be provided with a special surface geometry in order to be able to transmit as large as possible a friction force onto the harvest material so that using the movement of the press belt along the guide rollers, a rotation about the center axis of the round bale may be imposed onto the same.

Thus, in one or some embodiments, the pressing means 18 may be guided by a plurality of rollers 20, wherein the rollers 20 may be stationary or variably arranged. A roller designed as a stationary drive roller may be designated by 20a, which may transmit a drive force FD to the pressing means 18. Harvested material may be picked up (or collected) by a pick-up device 22, which may be in the form of a swath, guided along a rotor 24, whereby the harvested material may be comminuted and introduced into the baling chamber 12, where, in turn, the harvested material may be compacted and pressed into a round bale 16 (not shown in FIG. 1 but depicted in FIGS. 3a-b). The rotor 24 may thereby project into the baling chamber 12 and be in contact with a round bale 16, for example rotating in a clockwise direction, and rotate therewith. A finished, pressed round bale 16 is typically wrapped with a wrapping material, such as twine or netting, to stabilize the round bale 16 prior to ejection from the baling chamber 12.

The baling chamber 12 (which may comprise an example of the press chamber), in which the harvested material may be compacted, may be formed by an effective length of the pressing means 18. In one or some embodiments, an effective length of the pressing means 18 is the length of the pressing means 18 which may enclose the baling chamber 12 and, in particular, may act in contact with a round bale 16 and may transmit a pressing force thereto.

In one or some embodiments, the size of the baling chamber 12 may be varied by displacing rollers 20. The displaceable rollers 20 may each be arranged at the end of a first clamping arm 26 and a second clamping arm 28. The first clamping arm 26 may be pivotably mounted on the housing side and may have a plurality of rollers, such as two rollers 20 at its free end, which may guide a loop of the pressing means 18. By changing the position of the first clamping arm 26, the size of the baling chamber 12 may be changed. In one or some embodiments, as the harvested material continues to be fed into the baling chamber 12, the round bale 16 may steadily grow, wherein the first clamping arm 28 may be deflected as the size of the baling chamber 12 increases and, in particular, as the diameter of the round bale 16 increases. As the first clamping arm 26 is increasingly deflected, the size of the baling chamber 12 and the effective length of the pressing means 18 may increase. In order to avoid an excessive increase in the compaction pressure, additional pressing means 18 may be provided via a displacement of the second clamping arm 28, which may span a loop of the pressing means 18. For this purpose, the second clamping arm 28 may be pivoted in such a way that the loop of the pressing means 18 is reduced, and the thereby available length of the pressing means 18 may be used as an effective length. One or more hydraulically-actuated actuators, such as two hydraulically-actuated actuators 30, may be assigned to the first clamping arm 26, and one or more other hydraulically-actuated actuators hydraulically, such as actuated actuator 32, may be assigned to the second clamping arm 28.

The round bale 16 in the baling chamber 12 may grow as the harvested material is increasingly conveyed, which may cause the first clamping arm 26 to be deflected and may increase the effective length of the pressing means 18. The deflection of the first clamping arm 26 may be controlled by a pressure relief valve 34, which may comprise a device that regulates the pressure generated by the first clamping arm 26 and which may, in turn, allow the compaction pressure to be influenced or affected in addition to any one, any combination, or all of a bale shape, soft core bale or hard bale. A force may also be exerted on the free end of the second clamping arm 28 by the pressing means 18, which may cause the second clamping arm 28 to pivot away from the first clamping arm 26 due to the shown arrangement of the rollers 20. Since, when the second clamping arm 28 is pivoted, the loop of pressing means 18 formed there is reduced, the pressing means 18 available for the effective length may increase. By pivoting the second clamping arm 28, the pressing force may also be influenced or affected. In one or some embodiments, the deflection of the second clamping arm 28 may be controlled by another pressure relief valve 36. In this regard, pressure relief valve 36 may likewise affect the pressure applied by the second clamping arm 28.

Figure 2:
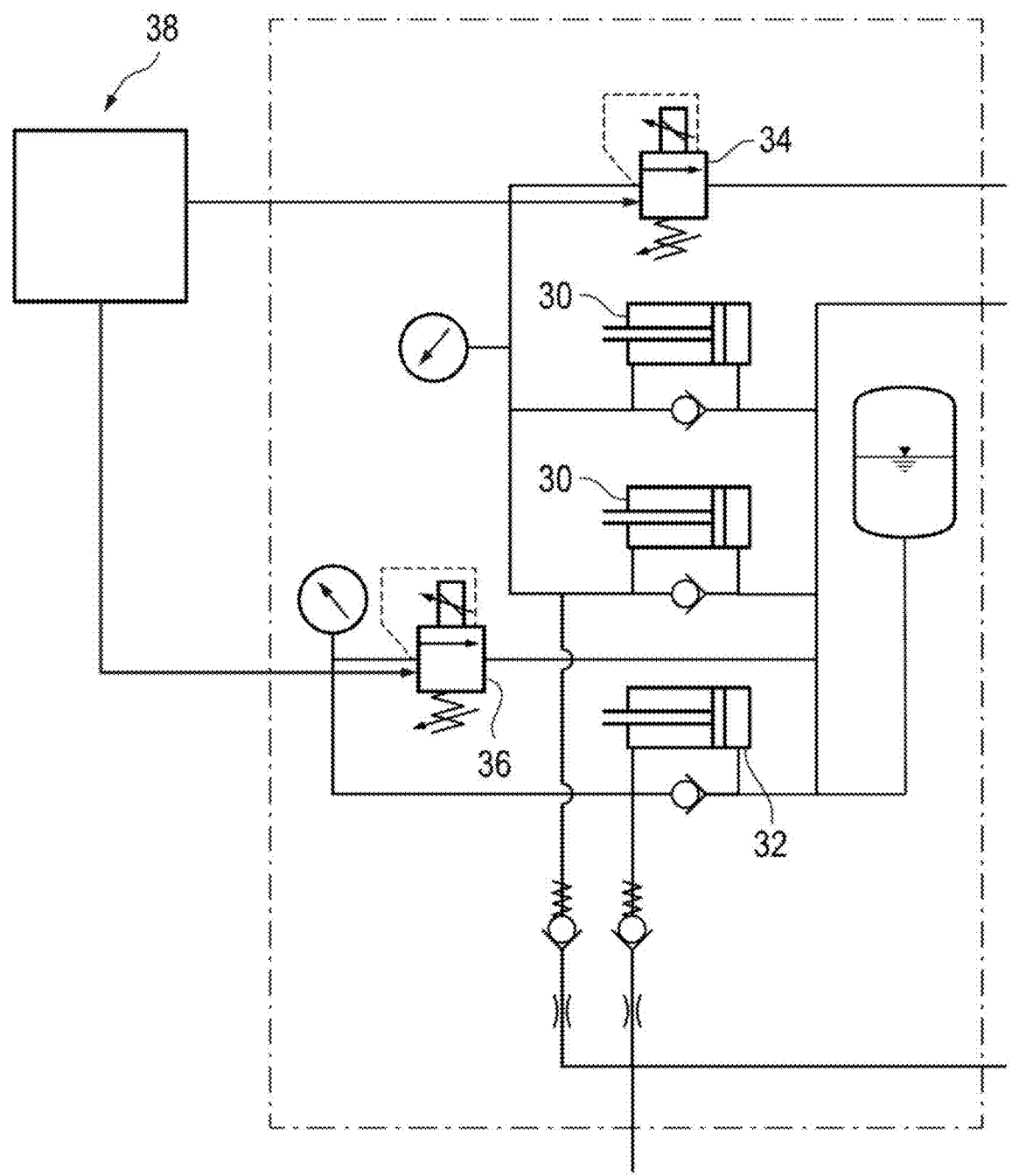
FIG. 2 shows an exemplary representation of a part of a hydraulic circuit of the round baler.

FIG. 2 shows an exemplary illustration of a part of a hydraulic circuit of the round baler 10. The pressing means 18 may apply compaction pressure to form the round bale 16. In one or some embodiments, the compaction pressure applied by pressing means 18 may be adjusted using one or both of the first and second clamping arms 26, 28. For their adjustment, the first and second clamping arms 26, 28 may be connected to one or more actuators, such as actuators 30, 32, which may be designed as hydraulic cylinders (e.g., may be supplied with a hydraulic fluid corresponding to the compaction pressure to be achieved). The pressure relief valves 34, 36 may be used to set the required or desired pressure values according to the compaction pressure to be achieved. The working pressures of the actuators 30, 32 of each of the first and second clamping arm 26, 28 may be monitored by the respective pressure relief valve 34, 36. The two pressure relief valves 34, 36 may make it possible to control or regulate the balance of forces between the first and second clamping arms 26, 28 using a control algorithm 84. For this purpose, the baler 10 may have a control unit 38 which is configured to set required pressure values for the compaction pressure to be achieved at the pressure relief valves 34, 36 and to run the control algorithm. In this regard, the control unit 38, using the control algorithm 84, may be configured to set values for one or both the two pressure relief valves 34, 36 (e.g., a first pressure relief valve and a second pressure relief valve) in order to control the balance of forces between the first and second clamping arms 26, 28.

Figure 3:
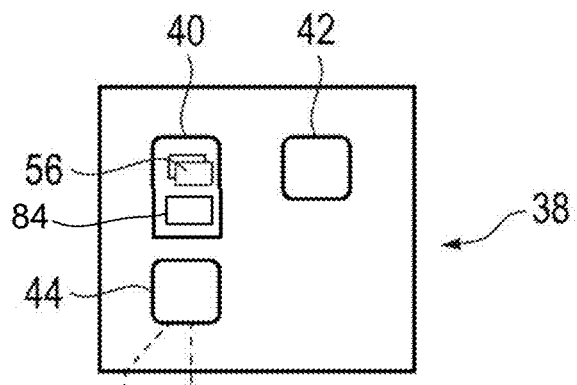
FIG. 3 shows a schematic representation of a control unit of the round baler.

FIG. 3 schematically shows the control unit 38 which comprises a memory unit 40, a computing unit 42 and an input/output unit 44. Thus, control unit 38 may comprise one example of computational functionality, which may include the computing unit 42 and the memory unit 40 that stores information and/or software (e.g., control algorithm 84). In one or some embodiments, the computing unit 42 (which may comprise a processor, microprocessor, controller, PLA, or the like) is configured to execute the software stored in the memory. For example, the computing unit 42 may be configured to execute control algorithm 88 to perform the functionality described herein. The memory unit 40 may comprise any type of storage device (e.g., any type of memory). Though the computing unit 42 and the memory unit 40 are depicted as separate elements, they may be part of a single machine, which includes a microprocessor (or other type of controller) and a memory. Alternatively, the computing unit 42 may rely on memory unit 40 for all of its memory needs.

The computing unit 42 and memory unit 40 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Using the input/output unit 44 (which may comprise a touchscreen), an operator of the baler 10 may enter one or more input variables, which may be used as a basis for the production of the round bale 16. Various input variables are contemplated. For example, the operator may specify any one, any combination, or all of the following input variables: a type of harvested material; a bale shape; bale diameter; or absolute or relative values for compaction pressures.

Figure 3A:
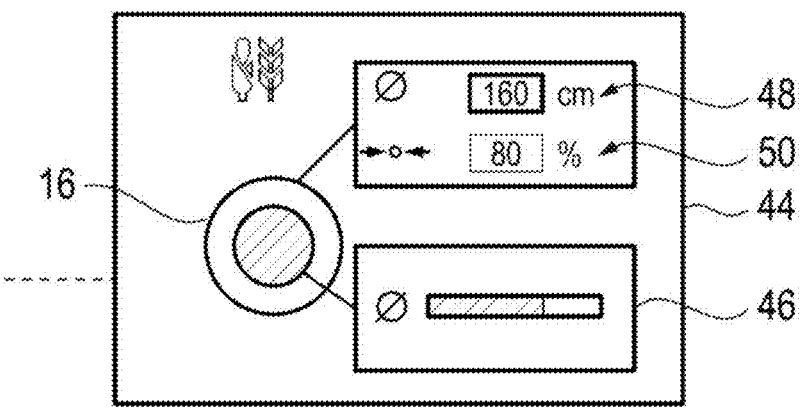
FIG. 3a shows an input menu for the harvested material type, straw, represented by an input-output unit of the control unit.

FIG. 3a shows an example of an input menu for the harvested material type, straw, represented by the input/output unit 44. The selected bale shape is the hard bale. The input for the bale diameter includes a bale start diameter 46 and a bale end diameter 48 as minimum and maximum values. In the case of the hard bale according to FIG. 3a, a relative value 50 may be entered for the compaction pressure with which the bale is to be compacted when the bale end diameter 48 is reached.

Figure 3B:
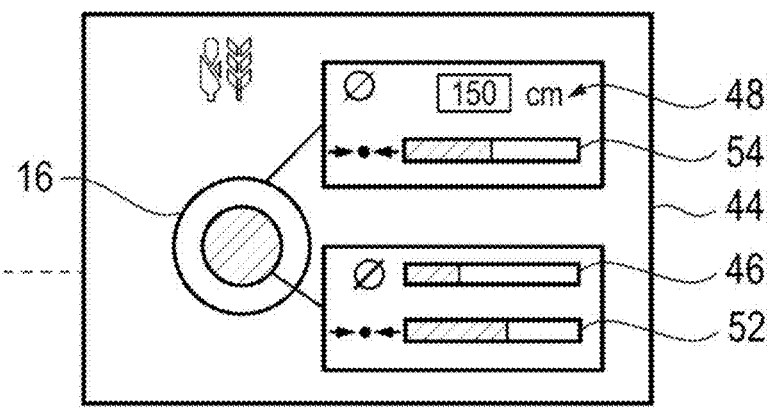
FIG. 3b shows an input menu for the harvested material type, silage, represented by an input/output unit of the control unit.

FIG. 3b shows an example of an input menu for the harvested material type, silage, represented by the input/output unit 44. The soft core bale is selected as the bale shape. In the case of the soft-core bale according to FIG. 3b, absolute values 52, 54 may be entered for the compaction pressures. The relative value 50 or the absolute values 52, 54 for the compaction pressures is input, for example, using bar charts, which may enable an input of a range of values. Other ways (separate from or in addition to bar charts) in which the enter input values are contemplated.

In one or some embodiments, the input variables may be used to determine the target compaction pressure depending on the current diameter of the round bale 16 based on a recipe.

The system may react, respond, or modify its operations responsive to one or more changes, such as one or more changes due to one or both of a change in operating parameter(s) or environmental parameter(s). Various changes are contemplated, such as changes in moisture contents and/or fluctuations in the supplied harvested material quantity. In particular, in order to be able to react or respond during the forming process, such as sporadically or periodically react, respond or modify, to arising changes of operating and/or environmental parameters (e.g., different moisture contents of the harvested material to be compacted, or fluctuations in the supplied harvested material quantity), the control unit 38 may us a compaction power curve 56. Specifically, the control unit 38 of the round baler 10, using the compaction power curve 56 and value(s) for changed operating parameter(s) or environmental parameter(s), may automatically control the actuators 30, 32 in order to adjust the first and second clamping arms 26, 28, thereby taking into account the operating parameters and/or environmental parameters of the round baler 10. In this way, a predetermined operating point, such as a substantially stable operating point 58, 60, in which the required compaction power PC and the available drive power PD are substantially equal, may be maintained in the compaction power curve 56 during the shaping process. In one or some embodiments, one or more compaction power curve 56 may be stored in the memory unit 40.

Figure 4:
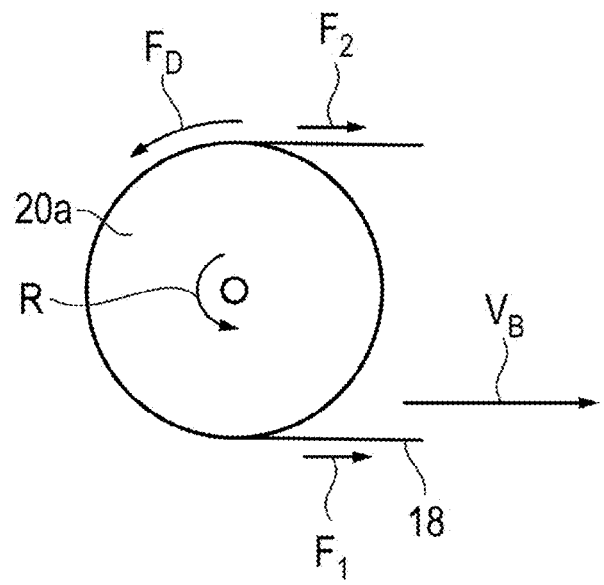
FIG. 4 shows a cutaway of a drive roller of the round baler to illustrate internal forces.
Figure 5:
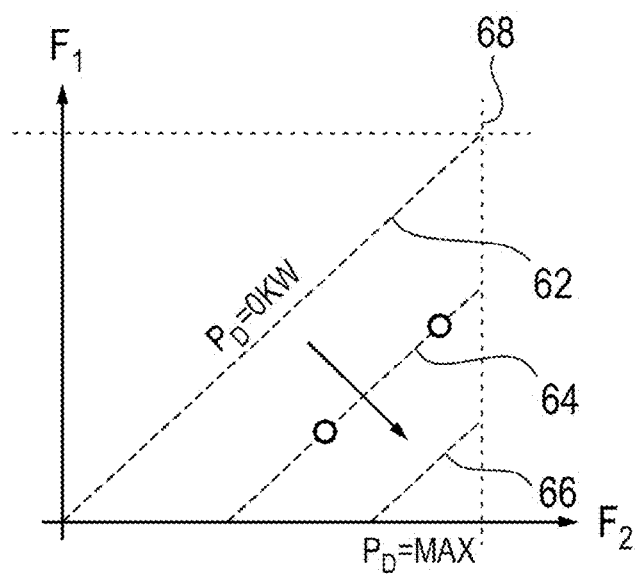
FIG. 5 shows an example of a diagram with different power levels of baler drive power.

FIG. 4 shows the cutaway drive roller 20a of the round baler 10 and the internal forces F1, F2 acting on the drive roller 20a rotating in the direction of rotation R. The pressing means 18 may be driven at a speed vB. The drive force FD transmitted to the pressing means 18 by the drive roller 20a is determined, without considering roller resistance and friction, from the difference between a force F2 at the drawn end of the pressing means 18 and a force F1 at the drawing end of the pressing means 18. FIG. 5 shows a diagram in which different power levels of the drive power PD are plotted for different compaction powers PC. The drive power PD may be determined from the product of the drive force FD and the speed vB at which the drive roller 20a is driven.

Thus, FIG. 5 shows an example of a diagram with different power levels 62, 64, 66, 68 of the drive power PD of the baler 10. The power level 62 may correspond to a drive power PD of 0 KW, and power level 68 may correspond to a maximum drive power PD.

Figure 6:
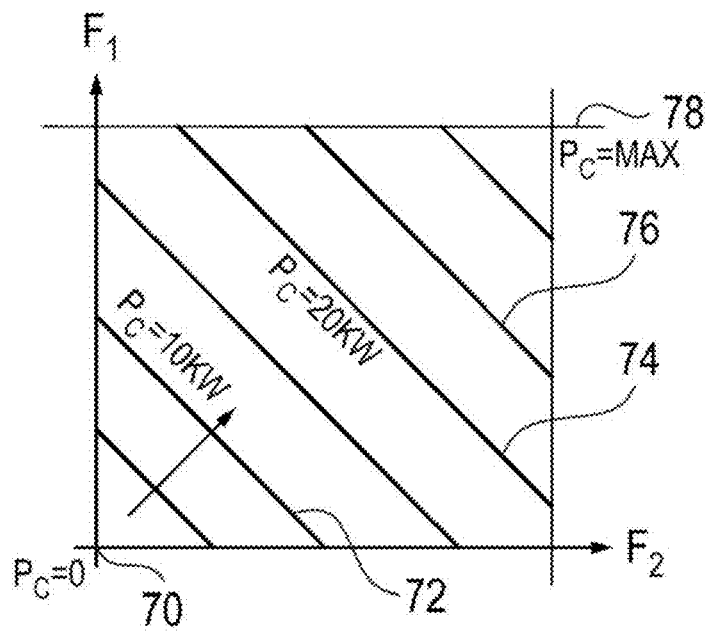
FIG. 6 shows an example of a diagram with different power levels of baler compaction power.

The illustration in FIG. 6 shows an example of a diagram with different power levels 70, 72, 74, 76, 78 of the compaction power PC of the baler 10. The power level 70 may correspond to a compaction power PC of 0 KW, and the power level 78 may correspond to a maximum compaction power PC. The power levels 72, 74, 76 shown in FIG. 6 between the power level 70 and the power level 78 are to be understood as examples. Other power levels are contemplated. The distribution of the power levels 72, 74, 76 may change depending on the feed rate with the harvested material and/or changes to the environmental parameters.

Figure 7:
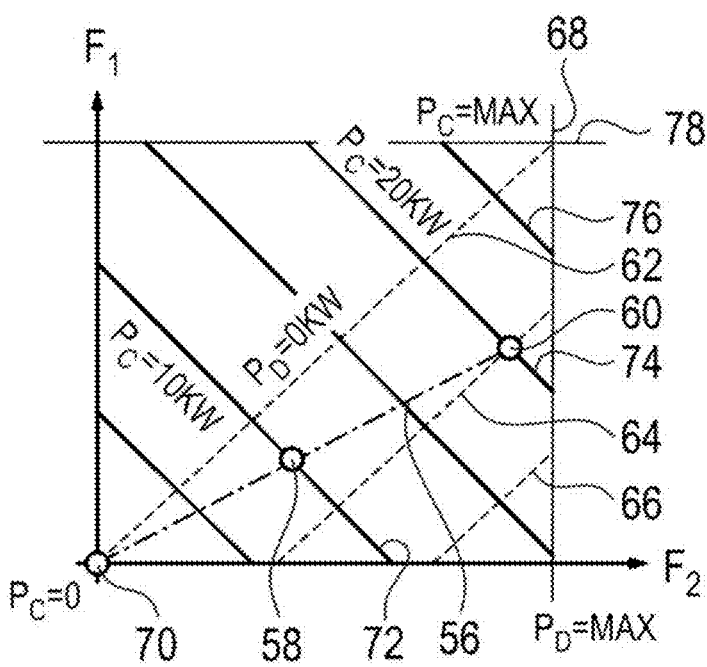
FIG. 7 shows an example of a diagram in which the diagrams according to FIGS. 5 and 6 are combined.

The illustration in FIG. 7 shows an example of a diagram in which the diagram for power levels 62, 64, 66, 68 of the drive power PD and the diagram with the different power levels 70, 72, 74, 76, 78 of the compaction power PC of the baler are combined in order to determine therefrom a stable operating point 58, 60 in which the required compaction power PC and the available drive power PD are essentially the same.

Figure 8:
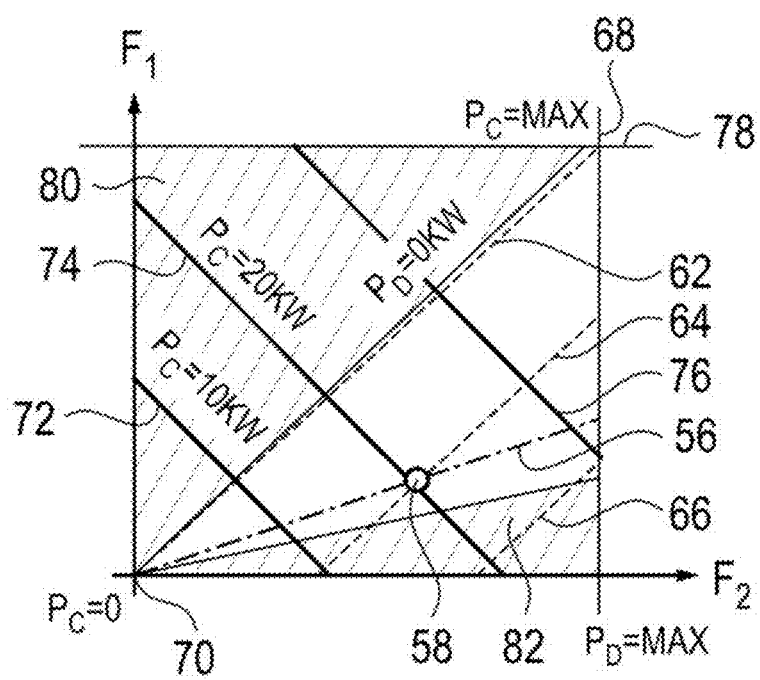
FIG. 8 shows an example of the diagram according to FIG. 7 with marked non-usable areas for the drive line and compression power.

The illustration in FIG. 8 shows an example of the diagram in FIG. 7, in which areas 80, 82 are indicated by hatching, which may limit the operating range for technical reasons. In area 80 above power level 62, no drive power is available. Slip may occur within area 82, so that this area may also not be available for determining a stable operating point 58.

As explained above, changes in the feeding of crop material into the bale chamber 12 and/or changes in the environmental parameters, such as different moisture contents of the crop material to be compacted, may cause the distribution of the power levels 72, 74, 76 for the compaction power PC to change. The control unit 38 may take (such as cyclically or periodically take) these changes into account and may determine a new stable operating point 58 that may consider these changes.

Using the input/output unit 44 of the control unit 38, a limited number of input variables may be specified by the operator, as explained by way of example with reference to FIG. 3a and FIG. 3b, in order to determine, depending on the input variables, the compaction power curve 56 to be specified from compaction power curves 56 stored in the memory unit 40 of the control unit 38. Referring to FIG. 3a for the production of a hard bale as a bale shape of the round bale 16, the input variables may be used to determine, based on a recipe, rules or the like, the target compaction pressure depending on the current diameter of the round bale 16. In the process, compaction may be performed at an initial compaction pressure until the specified bale start diameter 46 is reached. Until the bale end diameter 48 is reached, the compaction pressure specified as a relative value 50 may be cyclically increased to the set compaction pressure with which the round bale 16 is to be compacted when the bale end diameter 48 is reached. This may involve a cyclical increase, such as a stepwise increase, of the compaction pressure depending on reaching an absolute or relative current bale diameter. The stable operating point 58 for the respectively required compaction power PC may be determined in accordance with the above-described method in order to take into account and compensate for the influences of operating parameters and/or environmental parameters of the round baler 10 on the compaction power curve 56.

The procedure for producing a soft-core bale as a bale shape of the round bale 16 may be analogous. In so doing, compaction may take place at an initial compaction pressure (e.g., the absolute value 52 entered for the compaction pressure) until the specified bale start diameter 46 is reached, and then at a final compaction pressure (e.g., the absolute value 54 entered for the compaction pressure) until the specified final bale diameter 48 is reached. Here, as well, the stable operating point 58 for the respectively required compaction power PC may be determined in accordance with the above-described method in order to take into account and compensate for the influences of operating parameters and/or environmental parameters of the round baler 10 on the compaction power curve 56.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

10 Round bale press
12 Bale chamber
14 housing
16 Round bale
18 Pressing means
20 Role
20a Drive roller
22 Pick-up device
24 Rotor
26 First clamping arm
28 Second clamping arm
30 Actuator
32 Actuator
34 Pressure relief valve
36 Pressure relief valve
38 Control unit
40 Memory unit
42 Computing unit
44 Input/output unit
46 Bale start diameter
48 Bale diameter
50 Relative value of compaction pressure
52 Absolute value of compaction pressure
54 Absolute value of compaction pressure
56 Compaction power group
58 Stable operating point
60 Stable operating point
62 Power level
64 Power level 66 Power level
68 Power level
70 Power level
72 Power level
74 Power level
76 Power level
78 Power level
80 Area
82 Area
84 Control Algorithm
F1 Force
F2 Force
FD Drive force
PC Compaction power
PD Drive power
vB Speed
A Rotation direction

The invention claimed is:

1. A method for operating a round baler, the method comprising:
 operating the round baler, the round baler comprising a baling chamber having a variable diameter and positioned in a housing, the baling chamber being bounded by a rotating pressing device, wherein the pressing device is one or both of driven or guided by a plurality of rollers, wherein a loop of the pressing device is guided by a first clamping arm which is pivotably mounted on a side of the housing and includes one or more rollers on a side of the baling chamber, wherein the pressing device is guided by a second clamping arm which is pivotably mounted on the side of the housing and has at least one roller on a free end, wherein one or more hydraulically-actuated actuators adjust the first clamping arm and the second clamping arm so that at least one compaction pressure is generated with which the pressing device acts to form a round bale;
 accessing, by a control unit, at least one compaction power curve;
 accessing, by the control unit, one or both of one or more operating parameters or one or more environmental parameters; and
 automatically controlling, by the control unit using the at least one compaction power curve, the one or more hydraulically-actuated actuators to adjust at least one of the first clamping arm or the second clamping arm, by taking into account the one or more operating parameters that affect one or both of the at least one compaction power curve or the one or more environmental parameters of the round baler in order to maintain a substantially stable operating point during a shaping process of the round bale in which compaction power and drive power are substantially equal.

2. The method of claim 1, further comprising:
 inputting, via an input/output unit of the control unit, one or more input variables specified by an operator; and
 selecting the compaction power curve to access from a plurality of compaction power curves correlated to different input values that stored in a memory unit accessible by the control unit.

3. The method of claim 2, wherein the one or more input variables specified by the operator are a harvested material type, a bale shape, bale diameters and absolute or relative values for compaction pressures.

4. The method of claim 2, wherein the plurality of compaction power curves accessible by the control unit are used to control the one or more actuators in order to adjust force ratios of the first clamping arm and the second clamping arm.

5. The method of claim 2, wherein the one or more input variables are used to determine a target compaction pressure depending on a current diameter of the bale based on one or more rules.

6. The method of claim 1, wherein automatically controlling the one or more hydraulically-actuated actuators comprises dynamically applying, using the one or more actuators, one or more forces to the first clamping arm and the second clamping arm taking into account the one or both of the one or more operating parameters or the one or more environmental parameters.

7. The method of claim 1, wherein working pressures of the one or more actuators of each of the first clamping arm and the second clamping arm are monitored by a respective pressure relief valve.

8. The method of claim 1, further comprising monitoring, by the control unit, occurrence of slippage.

9. The method of claim 8, wherein the control unit automatically reduces the compaction power responsive to the control unit determining that a slip limit value is reached.

10. The method of claim 9, further comprising automatically outputting, by the control unit, a warning to the operator responsive to the control unit determining that a slip limit value is reached.

11. A round baler comprising:
 a baling chamber positioned in a housing and having a variable diameter;
 a rotating pressing device configured to bound the baling chamber, the pressing device including one or more rollers configured to perform one or both of drive or guide the pressing device, with a first clamping arm pivotably mounted on a side of the housing and including at least one of the one or more rollers on a bailing chamber side for guiding a loop, and with a second clamping arm pivotably mounted on the side of the housing and having at least one roller at a free end that is configured to guide the pressing device;
 one or more hydraulically-actuated actuators configured to adjust a position of the first clamping arm and the second clamping arm in order for the first clamping arm and the second clamping arm to generate a compaction pressure with which the pressing device is configured to form a round bale; and
 a control unit in communication with the one or more hydraulically-actuated actuators and configured to:
  access at least one compaction power curve;
  access one or both of one or more operating parameters or one or more environmental parameters; and
  automatically control, using the at least one compaction power curve, the one or more hydraulically-actuated actuators to adjust at least one of the first clamping arm or the second clamping arm, by taking into account the one or more operating parameters that affect one or both of the at least one compaction power curve or the one or more environmental parameters of the round baler in order to maintain a substantially stable operating point during a shaping process of the round bale in which compaction power and drive power are substantially equal.

12. The round baler of claim 11, further comprising an input-output unit configured to input one or more input variables by an operator.

13. The round baler of claim 12, wherein the input-output unit is configured to input a harvested material type, bale shape, bale diameter, and absolute or relative values for compaction pressures as input variables.

14. The round baler of claim 12, wherein the control unit is further configured to select, based on the one or more input variables input, the compaction power curve from a plurality of compaction power curves correlated to different input values that stored in a memory unit accessible by the control unit.

15. The round baler of claim 11, further comprising one or more sensor devices configured to generate data indicative of one or more of moisture content of collected harvested material, feed quantity collected, or feed quantity fed to the baling chamber.

16. The round baler of claim 11, wherein the control unit is further configured to automatically control the one or more hydraulically-actuated actuators by dynamically controlling, using the one or more actuators, one or more forces to the first clamping arm and the second clamping arm taking into account the one or both of the one or more operating parameters or the one or more environmental parameters.

17. The round baler of claim 11, further comprising a first pressure relief valve configured to set pressure applied by the first clamping arm and a second pressure relief valve configured to set pressure applied by the second clamping arm.

18. The round baler of claim 17, wherein the control unit is configured to set values for each of the first pressure relief valve and the second pressure relief valve in order balance force between the first clamping arm and the second clamping arm.

19. The round baler of claim 11, wherein the control unit is further configured to:
monitor, by the control unit, occurrence of slippage; and
automatically reduce the compaction power responsive to the control unit determining that a slip limit value is reached.

20. The round baler of claim 19, wherein the control unit is further configured to: automatically output a warning to the operator responsive to the control unit determining that a slip limit value is reached.

* * * * *